United States Patent [19]

Johnson, III

[11] E Patent Number: Re. 33,347

[45] Reissued Date of Patent: Sep. 25, 1990

[54] AIR-DRIVEN CEILING FAN

[76] Inventor: Johnny Johnson, III, 1815 Halsey Ave., New Orleans, La. 70114

[21] Appl. No.: 216,952

[22] Filed: Jul. 8, 1988

Related U.S. Patent Documents

Reissue of:

[64] Patent No.: 4,598,632
Issued: Jul. 8, 1986
Appl. No.: 428,889
Filed: Sep. 30, 1982

[51] Int. Cl.[5] ..... F24F 13/06

[52] U.S. Cl. ..... 98/40.05; 98/40.01; 98/40.24; 416/171; 417/406

[58] Field of Search ..... 98/39.1, 40.01, 40.05, 98/40.12, 40.13, 40.24, 40.28, 40.3; 416/171; 417/406, 407

[56] References Cited

U.S. PATENT DOCUMENTS

| | | | |
|---|---|---|---|
| 280,595 | 7/1883 | Fernie | 98/40.05 X |
| 571,424 | 11/1896 | Wolpe | 98/39.1 |
| 864,265 | 8/1907 | Rosenberg | 98/1 |
| 1,017,402 | 2/1912 | Gagnon | 98/40.01 |
| 1,333,651 | 3/1920 | Andrassy | 98/39.1 X |
| 2,038,347 | 4/1936 | Cornell, Jr. | 165/50 |
| 2,093,936 | 9/1937 | Spielmann | 98/34.6 |
| 2,239,848 | 4/1941 | Jackson | 62/289 |
| 2,363,839 | 11/1944 | Demuth | 98/31.5 |
| 2,505,394 | 4/1950 | Goettl | 98/40.2 |
| 2,633,070 | 3/1953 | Gillham | 417/406 |
| 3,760,708 | 9/1973 | Burup | 98/39.1 |
| 4,276,816 | 7/1981 | Tuley | 98/72 X |
| 4,326,453 | 4/1982 | La Boda et al. | 98/87 |

FOREIGN PATENT DOCUMENTS

| | | | |
|---|---|---|---|
| 568801 | 8/1977 | U.S.S.R. | 98/40.3 |
| 821857 | 4/1981 | U.S.S.R. | 98/40.01 |
| 909466 | 2/1982 | U.S.S.R. . | |
| 263953 | 1/1927 | United Kingdom | 98/40.01 |

*Primary Examiner*—Harold Joyce
*Attorney, Agent, or Firm*—Pravel, Gambrell, Hewitt Kimball & Krieger

[57] ABSTRACT

An air-driven ceiling fan uses air from the duct work system of a home such as the central air-conditioning system to harness that air flow and drive a ceiling fan having a plurality of blades which are spaced from the ceiling and upon a common shaft in a horizontal plane. Air flow through the duct work drives a squirrel cage blower which is mounted about a vertical axis so that air flow through the duct work also drives the squirrel cage blower and the ceiling fan.

7 Claims, 2 Drawing Sheets

AIR-DRIVEN CEILING FAN

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to ceiling fans and more particularly relates to ceiling fans having a plurality of for example two to six pitched blades which are spaced a distance below the surface of a room ceiling and suspended there below to rotate in a horizontal plane. Even more particularly the present invention relates to a ceiling fan of the type described and suspended below an air conditioning effluent duct and provided with means for rotating the multiple fan blades responsive to air flowing through the duct and into the room.

2. General Background

Various ceiling fans of different types and constructions are known in the art. Ceiling fans are usually electrically driven, and are provided with a means for hanging the fan with blades suspended a distance below the ceiling and rotating in a horizontal plane parallel to the ceiling. This positions the blades within the confines of the room to be cooled between ceiling and floor so that the blades are visible for aesthetic appeal and yet can evenly distribute air flow from the ceiling downwardly or vice versa in a circulating fashion.

Ceiling fans normally are suspended from the ceiling by means of a hook anchored in a ceiling beam or joist. A pipe connects to and depends from the hook and supports at its lower end the electrical motor. A spindle or rotating member forms a portion of the motor and to the spindle are a plurality of brackets each of which carries a single blade usually manufactured of wood. Such ceiling fans are commercially available and are known in the art. For example, typical manufacturers of such fans are Hunter of Memphis, Tenn., as well as Emerson Electric.

Ceiling fans of the electric type have been known for at least seventy to eighty years. Many of these ceiling fans were patented at the turn of the century and are known to be powered by either direct current or alternating current motors.

Use of such ceiling fans has become quite popular due in part to the utility and in further part to the ornamental and aesthetically pleasing appearance of the multiple blade construction which is disposed in the confines of the room and in clear view of occupants of the room. These motors usually turn at relatively low speeds of for example 250 to 500 r.p.m.'s so that the blades are visible. Thus the blades are usually of an attrative woodgrain finish or desired color.

Ceiling fans which are commercially available are typically electrically powered and thus require installation that might include structural modifications to an existing home and/or electrical rewiring.

Often times the dispersion of air into the home from such duct work creates drafts which are objectionable to the occupants. It is not uncommon to enter a room which has central air conditioning and heat and to sit in a particular position in the home and experience hot spots and cold spots. This problem is particularly irritating in places such as restaurants where it is not possible to move one's location to another spot in the room to get out of the path of onrushing cold air from an air conditioning duct.

Many devices have been patented which have attempted to solve the problem of distribution of air conditioning or heating as it is discharged into a room from a duct system. Devices of this type are typically known as "registers". See for example U.S. Pat. No. 2,363,839 entitled "Unit Type Air Conditioning Register". That device provides in part a housing secured to the discharge of the duct system. A motor is disposed within the duct work and provides a shaft to which is connected a fan which aids in the distribution of air currents.

Another type of air transfer device using a fan and motor arrangement can be seen in U.S. Pat. No. 4,326,453 entitled "Air Transfer Device". In that patent a device for transferring air from the upper region of a room through an open doorway to the exterior of that room such as to an adjacent room is provided. The device includes an open ended casing or conduit mounted upright to a wall of the room just above a doorway, an electric fan is mounted in the casing or conduit to draw air downwardly into and through the casing or conduit, and a hinged shute is positioned at the bottom of the casing or conduit which when declined downwardly deflects such downwardly moving air out through the open doorway to the exterior of the room.

An air conditioning apparatus is the subject of U.S. Pat. No. 2,239,848. That device provides a discharge into a room from an attic area and includes in part a motor and a plurality of blades which are placed in proximity to the register which forms an interface between the ceiling and the room.

U.S. Pat. No. 3,760,708 provides a "Ventilating System" for an enclosed space such as a room.

U.S. Pat. No. 2,093,936 issued to H. J. Spielmann provides an "Air Conditioning Device". That patent shows the use of a fan positioned at a register at the exit of a duct work system into a room with a baffle plate and the fan in combination assisting in distribution of air into the room.

U.S. Pat. No. 571,424 entitled "Heating and Ventilating Apparatus for Buildings" shows another device which utilizes an electrical fan in a partition so that air can be supplied by natural or forced draft.

U.S. Pat. No. 1,333,651 entitled "Ventilator" relates to a ventilator of the type used on ships for ventilation between and below decks.

In U.S. Pat. No. 2,038,347 there is provided a "Air Conditioned Heating and Cooling System". In that patent there is seen an air conditioning system which utilizes air pressure in order to drive a fan that has a plurality of blades mounted on a common shaft. Air pressure is used to power a number of small vanes mounted for rotation on the common shaft with the fan blades.

3. General Discussion of the Present Invention

None of these patented devices provide a ceiling fan having a plurality of visible blades which are aesthetically pleasing, placed inside the confines of the room to be cooled or in which air is to be circulated, the blades being placed a distance below the ceiling of the room. Further, the present invention provides a common shaft which is driven by a squirrel cage type blower by air which flows through the duct work system of the home as force driven by a central air conditioning system. A housing is provided for attaching the apparatus to the effluent discharge of the duct work system into the room at the room register. Air entering the squirrel cage blower is diffused laterally into the room and the movement of duct work air from the duct work through the register and into the squirrel cage blower and thereafter after into the room produces rotational energy which is transferred from the squirrel cage blower to the common shaft and the fan blades which rotate in a horizontal plane a distance below the ceiling.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PREFERRED EMBODIMENT

Figure 1:
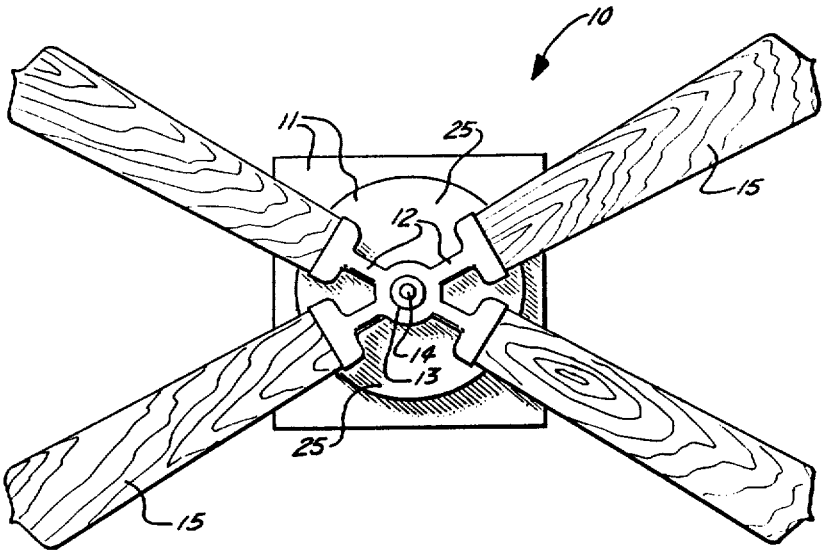
FIG. 1 is a bottom view of the preferred embodiment of the apparatus of the present invention.
Figure 2:
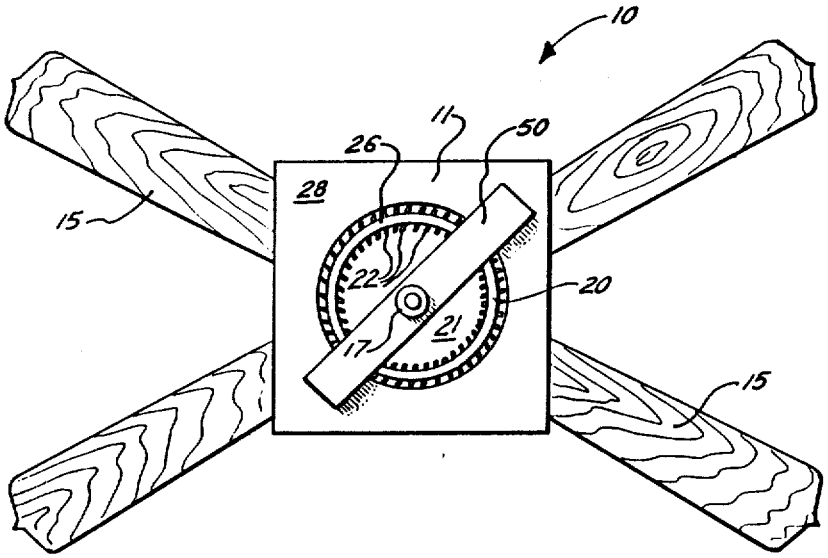
FIG. 2 is a top view of the preferred embodiment of the apparatus of the present invention.
Figure 3:
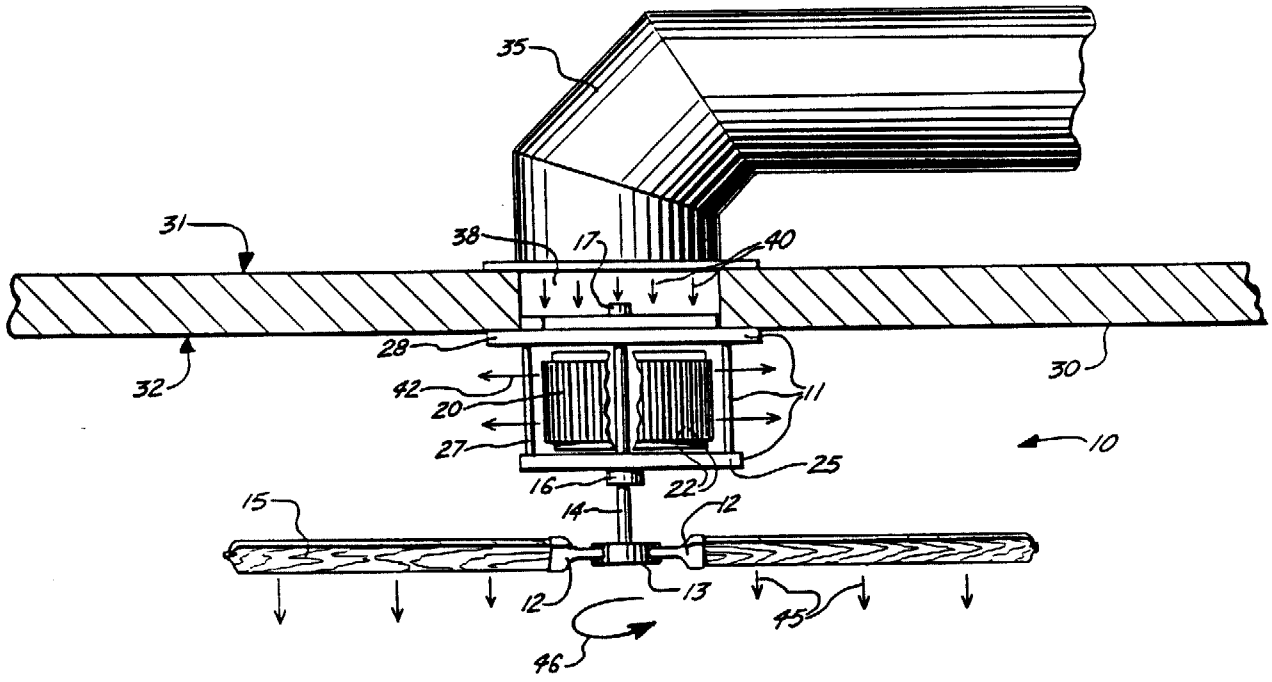
FIG. 3 is a side partially broken elevational view of the preferred embodiment of the apparatus of the present invention illustrating use of the device in combination with an air conditioning duct work system.

FIGS. 1 and 2 show generally the preferred embodiment of the apparatus of the present invention designated generally by the numeral 10. The ceiling fan 10 provides a housing 11 that comprises a bottom plate 25, a top plate 28 and a plurality of connecting struts *27*. Top plate 28 would be generally flat on its upper surface and would be positioned adjacent the ceiling of a room to which apparatus 10 would be added with the top plate 28 abutting against the ceiling in a face-to-face arrangement as best seen in FIG. 3. A suitable hanger 50 could take the form of for example an elongated bar other such member which would sandwich the ceiling inbetween the hanger 50 and the plate 28. This is exemplary and other means for hanging plate 28 to a ceiling of a room could be utilized such as for example bolting, or other such fasteners. Further, connectors on the upper surface of plate 28 could take the form of clips designed to interlock plate 28 with existing register connections formed on the register outlet which is mounted in the ceiling of the air conditioning system.

Disposed within housing 11 in a rotational fashion is squirrel cage blower 20 which rotates with common shaft 14. In FIGS. 1 and 2 shaft 14 can be seen terminating at its lower end portion at hub 13 which attaches to a plurality of brackets 12 each of which carries fan blade 15. During operation, fan blades 15 will rotate in a horizontal plane and will be spaced a distance below the surface of ceiling 30 as best seen in FIG. 3. As will be described more fully hereinafter, blades 15 are both functional and asthetically pleasing, emulating the blade positioning of prior art type ceiling fans which are electrically driven and which are hung from a ceiling in a spaced horizontal arrangement.

A pair of bearing assemblies 16,17 are provided for forming an interface between common shaft 14, and housing 11. It will be understood by one skilled in the art that housing 11 is stationary and attached to ceiling 30 as best seen in FIG. 3 while squirrel cage blower 20 and shaft 14 rotate as well as rotating hub 13, brackets 12 and blades 15.

Squirrel cage blower 20 provides the driving force for rotating shaft 14 and thus blades 15. To illustrate, with regard to FIG. 3, there can be seen duct work 35 which terminates at opening 38 in ceiling 30. Ceiling 30 would provide an outer surface 32 generally parallel with the floor of a room and innersurface 31. Plate 28 of housing 11 is shown abutting the lower surface 32 of ceiling 30 and would be affixed as aforedescribed by conventional means. Air would flow through duct work 35 which would be hollow and dispense through opening 38 of ceiling 30 into the confines or inner portion of squirrel cage blower 20. The inner confines of blower 20 can be seen best in FIG. 2 as being that area internal of ring 26. Ring 26 would be attached to the upper surface of a plurality of vanes 22 which vanes would affix at their bottom portion to a rotating plate 21. Plate 21 would be affixed to shaft 14 and rotate therewith. *Plate 21 serves as a means to direct air flow laterally out of blower 20.*

Air entering the inner portion of blower 20 would be dispensed laterally through the spaces between vanes 22 as best shown in FIG. 3. Arrows 42 represent such lateral movement of air through squirrel cage blower 20 and through the individual vanes 22 thereof. Since vanes 22 are angular disposed, this movement of air causes a rotation of lower 22 and a corresponding rotation of shaft 14, hub 13, brackets 12 and blades 15. From the above, it can be seen that air is dispensed both laterally and downwardly as shown by the arrows 42 and 45 respectively of FIG. 3. Curved arrow 46 represents the rotational movement of blades 15.

Thus the apparatus of the present invention is totally air driven using air which is flowing through the duct work as powered by conventional central air conditioning systems.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An air driven ceiling fan apparatus comprising:

a. a housing which is positioned adjacent an opening in the ceiling of a room;

b. duct work means positioned above said opening and communicating with said opening for providing air flow through the opening into the room defined along an air flow path;

c. a vertical drive shaft rotatably connected to the housing and extending downwardly into the room;

d. blower means disposed in the housing and on the defined air flow path, being connected to said shaft, to receive air flow from the duct work means for rotating the shaft, the blower means including a plurality of spaced apart vanes which surround the opening so that air flow between the duct work means and the room passes through the vanes before entering the room;

e. a hub connected to the lowermost portion of the shaft for rotation therewith; and f. a plurality of [horizonally] *horizontally* disposed pitched fan blades, spaced radially about the hub and extending therefrom, the fan blades being spaced a vertical distance below the ceiling lower surface whereby air flow from the duct work means dispensing from the blower means thereby [driving] *drives* the pitched fan blades.

2. The ceiling fan of claim 1 wherein the fan blades rotate in a horizontal plane spaced from the room ceiling.

3. The ceiling fan of claim 1 wherein the blower means is a cylindrical squirrel cage blower and the shaft connects to and rotates with the blower means at the center of rotation of the squirrel cage blower.

4. The ceiling fan of claim 1 wherein the blower means comprises a rotatable circular plate and a plurality of radially spaced apart vertical vanes attached at the lower ends to the periphery of the plate which in combination cover the opening, defining therewith an interior receptive of air flow from the duct means and vanes surrounding the opening.

*5. An air-driven fan apparatus comprising:*

*(a) a housing;*

*(b) means for positioning the housing adjacent an opening in the ceiling of a room, the opening having duct work means positioned thereabove, the duct work means communicating with the opening for providing air flow through the opening into the room along an air flow path;*

*(c) blower means disposed in the housing to receive air flow from the duct work means, the blower means including a plurality of spaced-apart vanes which surround the opening so that air flow between the duct work means and the room passes through the vanes before entering the room, the vanes being shaped and positioned such that the blower means rotates when air flows from the duct work means through the vanes into the room; and*

*(d) means to direct the air flow laterally out of the blower.*

*6. The apparatus of claim 5, wherein the blower means is a cylindrical squirrel cage blower.*

*7. The apparatus of claim 5, wherein:*

*the blower means includes a rotatable circular plate; and*

*the vanes are vertical, radially spaced apart, have lower ends, and are attached at their lower ends to the periphery of the plate.*

* * * * *